US00RE40633E

(19) United States
(12) Reissued Patent
Porter

(10) Patent Number: US RE40,633 E
(45) Date of Reissued Patent: *Feb. 3, 2009

(54) USER CENTRIC PRODUCT FILES DISTRIBUTION

(76) Inventor: Swain W. Porter, 550 Kirkland Way Suite 404, Kirkland, WA (US) 98033

( * ) Notice: This patent is subject to a terminal disclaimer.

(21) Appl. No.: 11/078,918
(22) Filed: Mar. 11, 2005

Related U.S. Patent Documents

Reissue of:
(64) Patent No.: 6,532,588
Issued: Mar. 11, 2003
Appl. No.: 09/323,579
Filed: Jun. 1, 1999

U.S. Applications:
(63) Continuation-in-part of application No. 09/177,443, filed on Oct. 21, 1998, now Pat. No. 6,195,796.

(51) Int. Cl.
*G06F 9/44* (2006.01)
*G06F 9/445* (2006.01)
*G06F 15/173* (2006.01)
*G06F 12/00* (2006.01)
*G06F 17/00* (2006.01)

(52) U.S. Cl. ..... 717/170; 717/177; 717/122; 707/203; 715/229; 709/223

(58) Field of Classification Search ..... 717/168–178; 707/203; 715/511; 713/191; 700/121; 701/33
See application file for complete search history.

(56) References Cited

U.S. PATENT DOCUMENTS 4,558,413 A * 12/1985 Schmidt et al. ..... 707/203
4,912,637 A * 3/1990 Sheedy et al. ..... 707/203
5,357,631 A * 10/1994 Howell et al. ..... 707/203
5,495,610 A * 2/1996 Shing et al. ..... 709/221
5,734,899 A * 3/1998 Yoshizawa et al. ..... 707/203
5,809,287 A * 9/1998 Stupek et al. ..... 703/22
5,835,911 A * 11/1998 Nakagawa et al. ..... 707/203
5,845,077 A * 12/1998 Fawcett ..... 709/221
5,903,897 A * 5/1999 Carrier et al. ..... 707/203
5,909,581 A * 6/1999 Park ..... 717/170
5,933,646 A * 8/1999 Hendrickson et al. ..... 717/169
5,960,196 A * 9/1999 Carrier et al. ..... 717/122
6,282,709 B1 * 8/2001 Reha et al. ..... 717/175
6,295,491 B1 * 9/2001 Ayoub et al. ..... 701/33
6,442,446 B1 * 8/2002 Nakamura et al. ..... 700/121

FOREIGN PATENT DOCUMENTS

DE 2325766 A * 2/1998
WO WO 98/27487 * 6/1998

* cited by examiner

*Primary Examiner*—Hoang-Vu A Nguyen-Ba
(74) *Attorney, Agent, or Firm*—Schwabe, Williamson & Wyatt, P.C.

(57) ABSTRACT

A user centric approach to [program] product distribution, *such as a program product,* including a complementary multi-vendor code control system (MVCCS) suitable for use to practice the user centric distribution approach is disclosed. Under the user centric approach, versioning control information of the [source/object] files of various [program] products to be installed on various user computer systems are maintained on a user computer system by user computer system basis. Each user computer system or its proxy is provided with a portion or an entire MVCCS to facilitate receipt and storage into a common repository for the user computer system versioning control information of different [source/object] files of different [software] vendors, and to facilitate retrieval of selective versions of the different [source/object] files for the user computer system using versioning control information stored in the common repository for the user computer system. [In one embodiment, the MVCCS is further equipped to facilitate receipt and storage into a common library, the different source/object files identified by corresponding universally unique identifiers (UUID), and the versioning control information includes predecessor UUID information. In one embodiment, both the common repository and the common library, as well as the entire MVCCS are disposed on the user computer system.]

64 Claims, 10 Drawing Sheets

USER CENTRIC PRODUCT FILES DISTRIBUTION

Matter enclosed in heavy brackets [ ] appears in the original patent but forms no part of this reissue specification; matter printed in italics indicates the additions made by reissue.

RELATED APPLICATION

This is a continuation-in-part application of U.S. patent application Ser. No. 09/177,443, filed on Oct. 21, 1998, U.S. Pat. No. 6,195,796 entitled "User Centric Source Control".

BACKGROUND OF THE INVENTION

1. Field of the Invention

The present invention relates to the field of computer systems. More specifically, the present invention relates to methods and apparatuses associated with the distribution of program products for computer systems.

2. Background Information

Program products are typically distributed in a vendor centric manner as illustrated in FIG. 1. Code control system is employed to provide versioning control to source files associated with program products on the vendors' system or systems. Only the "release" version of a program product source file is converted into object or executable form for distribution to the users, and the conversion process is performed on the vendors' systems. Examples of these vendor centric code control systems include those disclosed in U.S. Pat. Nos. 4,558,413, 4,912,637, 5,357,631 and 5,495,610.

Under this conventional vendor centric approach to source control and distribution, each program product group or software vendor goes about its development, conversion and distribution with little regard to other program product groups or software vendors, except perhaps performing certain amount of system level testing with a small group of selected program products. As a result, it is not unusual for a user, upon installing a number of program products, to find that the program products are incompatible and may not operate together, or upon applying a fix to one program product, other previously functioning program products or the entire system would fail. Once finding himself/herself in such a predicament, there are few choices available to the user, and furthermore, there are limited tools available for the user to deal with the problems. Often times, the remedial action requires distribution of an entire replacement version, as opposed to merely the "broken" or "offending" parts.

Additionally, the prior art vendor centric approach to source control is also restrictive in fostering program product interoperability. For example, a vendor of a program product requiring minor extension support from another program product of a different vendor would nevertheless require support and close cooperation from the other vendor. As a further example, users of the same program product are often frustrated in their cooperation by virtue of the fact that they operate with different version levels of the vendor's program product.

These problems or disadvantages are especially undesirable in view of the opportunities to offer the ever increasing population of potential users (which are typically novice), an ever increasing array of functionally rich consumer program products for installation and use on their ever more powerful personal computer systems. Thus, an improved approach to software distribution, including a complementary code control system, is desired.

SUMMARY OF THE INVENTION

A user centric approach to program product distribution, including a complementary multi-vendor code control system (MVCCS) suitable for use on a user computer system or its proxy to practice the user centric distribution approach is disclosed. Under the user centric approach, versioning control information of various program products to be installed on various user computer systems are maintained on a user computer system by user computer system basis. Each user computer system and/or its proxy is provided with a portion or the entire MVCCS to facilitate receipt and storage into a common repository for the user computer system versioning control information of different source/object files of different software vendors, and to facilitate retrieval of selective versions of the different source/object files for the user computer system using versioning control information stored in the common repository for the user computer system.

In one embodiment, the MVCCS is further equipped to facilitate receipt and storage into a common library, the different source/object files. In one embodiment, the different source/object files are identified by corresponding universally unique identifiers (UUID), and the versioning control information includes predecessor UUID information. In one embodiment, the common repository is disposed on the user computer system. In one embodiment, the common library is also disposed on the user computer system.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented in terms of operations performed by a computer system, using terms such as tables, files, data and the like, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical and electrical components of a digital system; and the term digital system include general purpose as well as special purpose data processing machines, systems, and the like, that are standalone, adjunct or embedded.

Various operations will be described as multiple discrete steps performed in turn in a manner that is most helpful in understanding the present invention, however, the order of description should not be construed as to imply that these operations are necessarily order dependent, in particular, the order the steps are presented.

Figure 1:
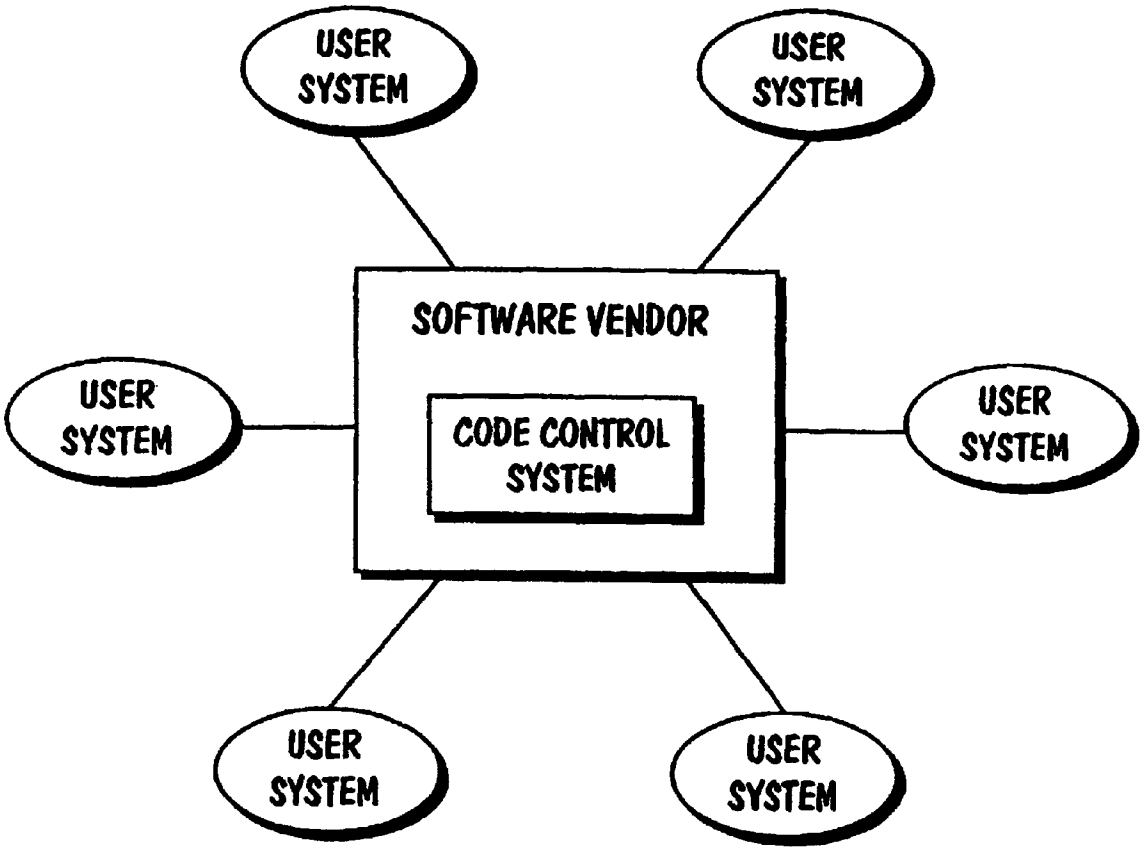
FIG. 1 (PRIOR ART)
FIG. 1 illustrates the prior art vendor centric approach to program product distribution and source control.
Figure 2:
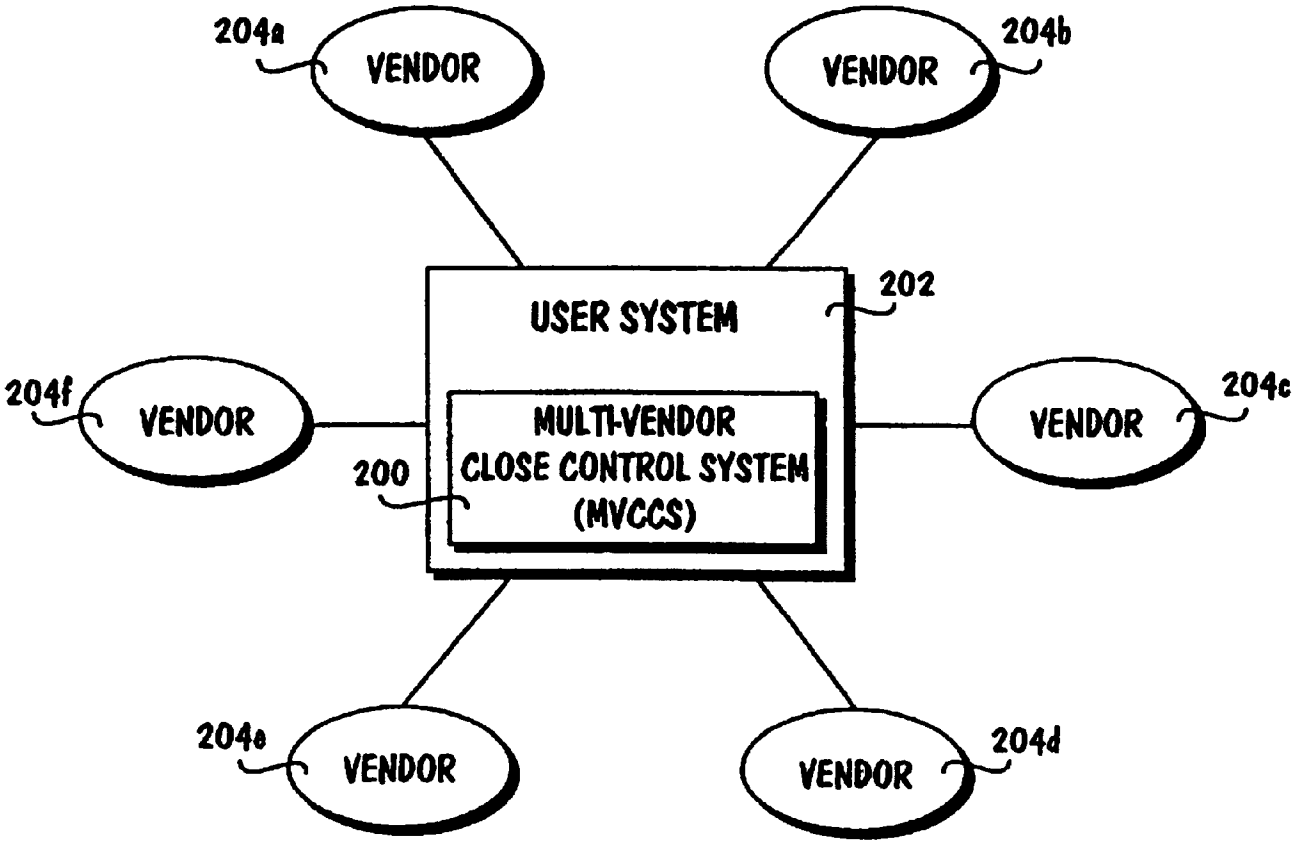
FIG. 2 illustrates an overview of the user centric approach of the present invention in accordance with one embodiment.

Referring now to FIG. 2, wherein an overview of the present invention in accordance with one embodiment is shown. As illustrated, in accordance with the teachings of the present invention, unlike the prior art, an user centric approach is employed for program product distribution. More specifically, each user system 202 is associated with a multi-vendor code control system (MVCCS) 200 that provides versioning control for source and object files of program products of vendors 204a–204f to be installed or installed on user system 202. MVCCS 200 includes, in particular, versioning control information, on a user system by user system basis, for the source and object files of the program products of vendors 204a–204f. For the illustrated embodiment, user system 202 is provided with its own MVCCS 200, which maintains the versioning control information for user system 202 only. Other alternate embodiments are also possible, so long as the user system by user system correspondence principle is maintained for versioning control information, to be described more fully below. Before doing so, it should be noted that the number of vendors shown in FIG. 2 are straightly illustrative. The present invention may be practiced with program products of more or less vendors. Furthermore, the term "program products" is intended to represent a broad category of software systems, subsystems as well as application product, and the term "source files" is intended to include source files written in a broad category of programming languages, including but not limited to C, C++, *the* HTML *programming language*, *the* XML *programming language*, [Java™] *and the JAVA* and [JavaScript] *JAVASCRIPT programming languages*, as well as natural languages, such as English, Spanish and so forth (i.e. text files).

Figure 3:
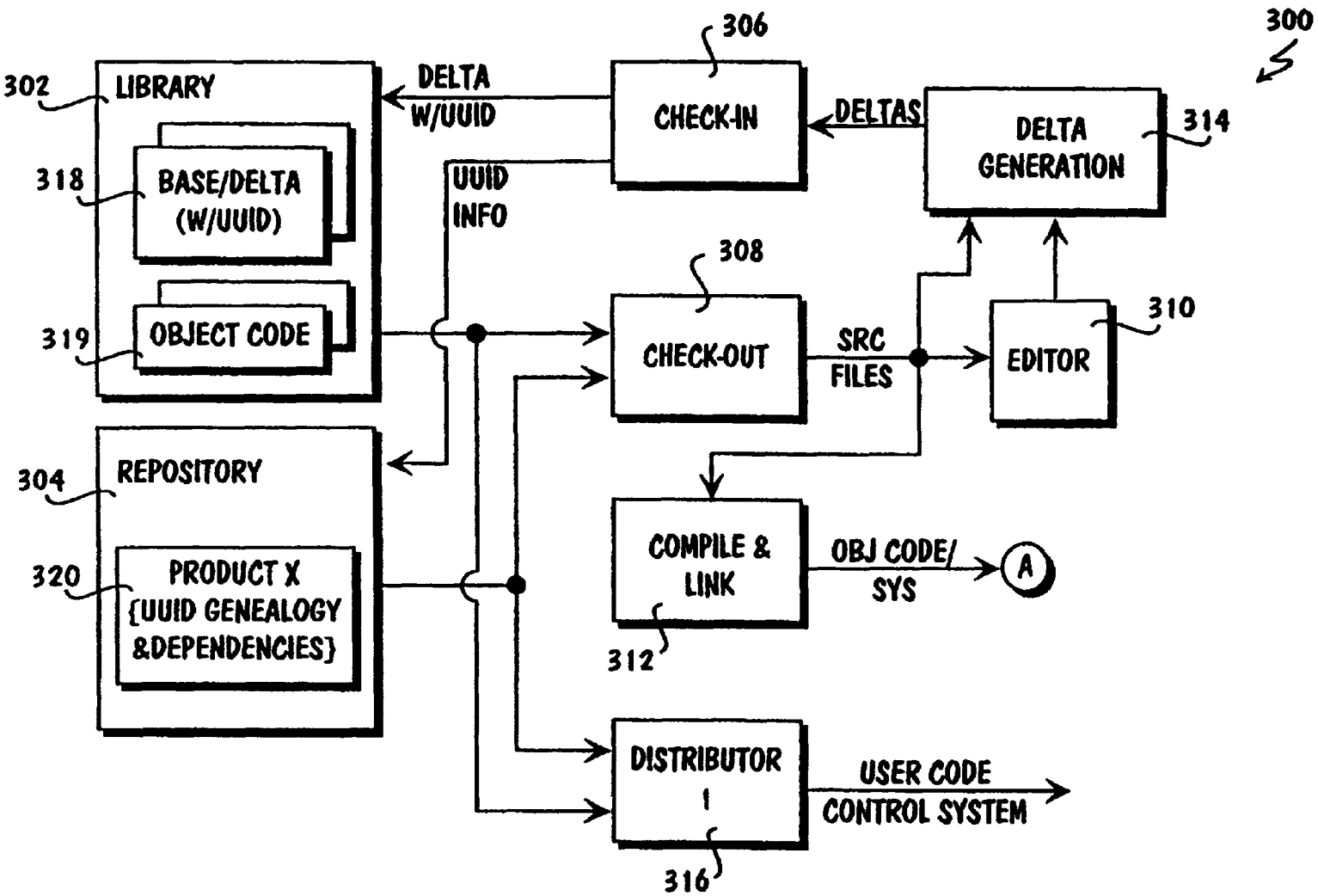
FIG. 3 illustrates one embodiment of a vendor development/code control environment suitable for practicing the present invention.

Referring now to FIG. 3, wherein one embodiment of a vendor development/code control environment suitable for use to practice the present invention is shown. As illustrated, vendor development/code control environment 300 provides versioning control for the source and object files of one or more program products of the particular vendor on a delta basis. That is, each version of a source file is formed by combining the root or base source file with a number of subsequent changes or deltas. Each version of an object file is generated from a corresponding combination of base and delta source files. For the illustrated embodiment, development/code control environment 300 includes library 302, repository 304, check-in and check out functions 306–308, editor and compiler/linker 310–312, delta generator 314 and distributor 316. The elements are operatively coupled to each other as shown.

Library 302 is used to store source files 318 of a program product in either a base or a delta form (depending on whether the source file is the root or a subsequent change), as well as object files 319 of the program product. Each base/delta source file 318 is advantageously identified by an universally unique identifier (UUID), that uniquely identifies the base/delta source file not only among the base/delta source files of the program product, but among the source files of all program products of all vendors. The UUID also uniquely identifies the corresponding object file generated from source files inclusive of the particular delta source file. Repository 304 is used to store versioning control information 320 of source and object files 318 and 319. Versioning control information 320 includes in particular predecessor UUID information for each UUID. For the illustrated embodiment, versioning control information 320 also includes cross program product dependency information for the UUIDs, locking information to prevent a corresponding base/delta source file from being further updated, and security/privilege information to prevent unauthorized updates. In alternate embodiments, other control information may also be included in addition to or in lieu of (in part or in whole) the above enumerated control information.

Check-in and check-out functions 306–308 perform their conventional functions of checking in the base/delta source files or selectively checking out different versions of the source and object files, except that check-in and check-out functions 306–308 operate with source and object files that are advantageously identified by the above described UUIDs. Editor 310 performs its conventional function of editing the checked out source files, and compiler/linker 312 performs its conventional function of compiling/linking the checked out/edited compilable source files. Similarly, delta generator 314 performs the conventional function of creating delta source files based on the check-out and modified versions of a source file. Last but not least, distributor 316 performs the conventional function of distributing program products to users, except distributor 316 operates to distribute versioning control information 320, and in some embodiments, base/delta source files 318 and/or object files 319 to MVSCS of the user systems, in accordance with the teachings of the present invention. For the purpose of this application, the term distribution includes packaging of the program products onto distribution medium, such as tapes, diskettes, CDROM, and so forth, for distribution, as well as transferring of the program products to the user systems or their proxies (such as a corporate or publisher server) through a wireless or wired medium, such as a public data network (e.g. the Internet).

Figure 4:
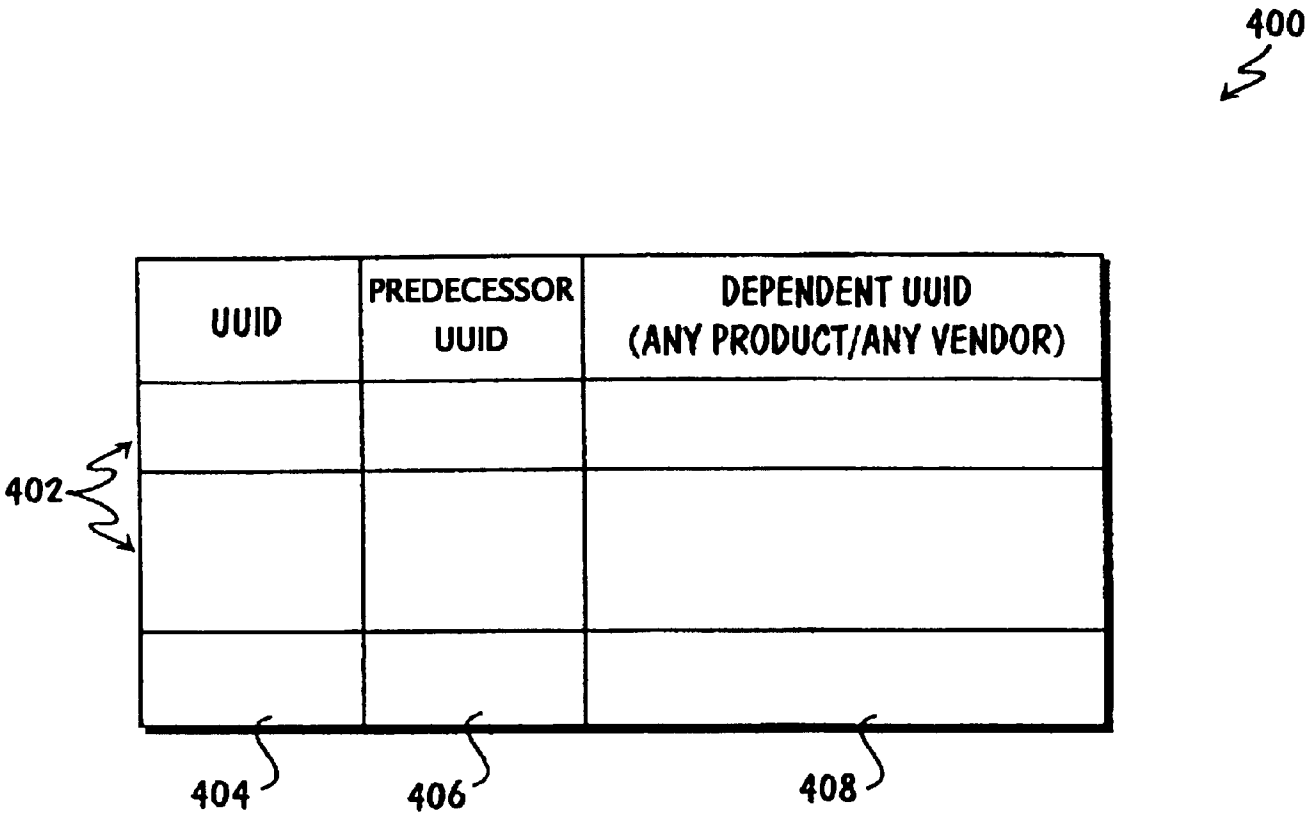
FIG. 4 illustrates one embodiment of a data structure suitable for use to maintain the predecessor UUID and related information of FIG. 3.

FIG. 4 illustrates an exemplary data structure suitable for use to store the versioning control information in repository 304 to practice the present invention. As illustrated, table 400 includes a number of version control entries 402, one for each UUID. Each version control entry 402 includes the corresponding UUID 404, its predecessor UUID 406, and any dependency for the UUID 408. The dependency information may be intra product dependencies as well as dependencies on other program products. In other embodiments, each version control entry 402 may also include other control information, such as the above described locking and security/privilege control information. In other embodiments, one or more other organized data structures, such as metafiles, individually or in combination, may be employed to store versioning control information 320 instead.

Figure 5:
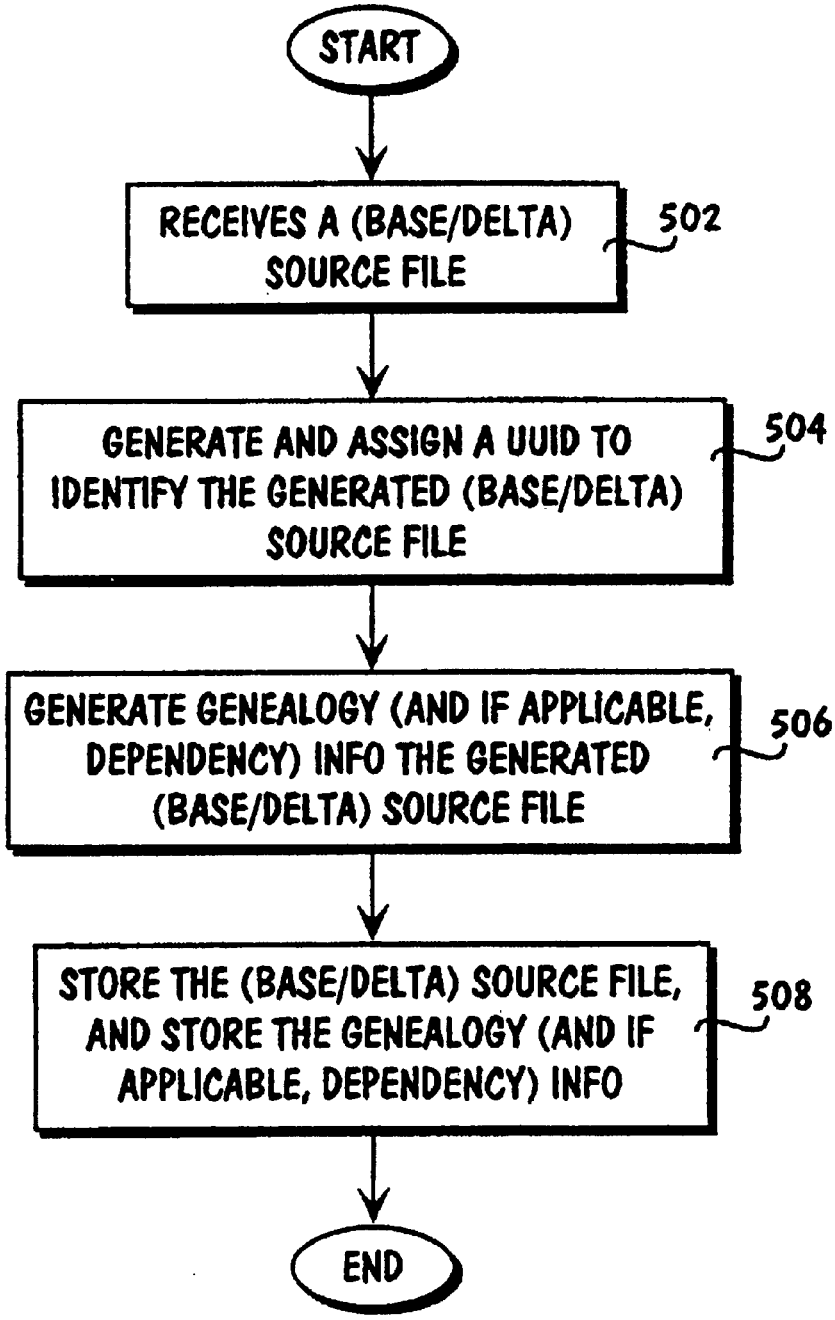
FIGS. 5–6 illustrate one embodiment each of various operational flows for the vendor development/code control environment of FIG. 3.
Figure 6:
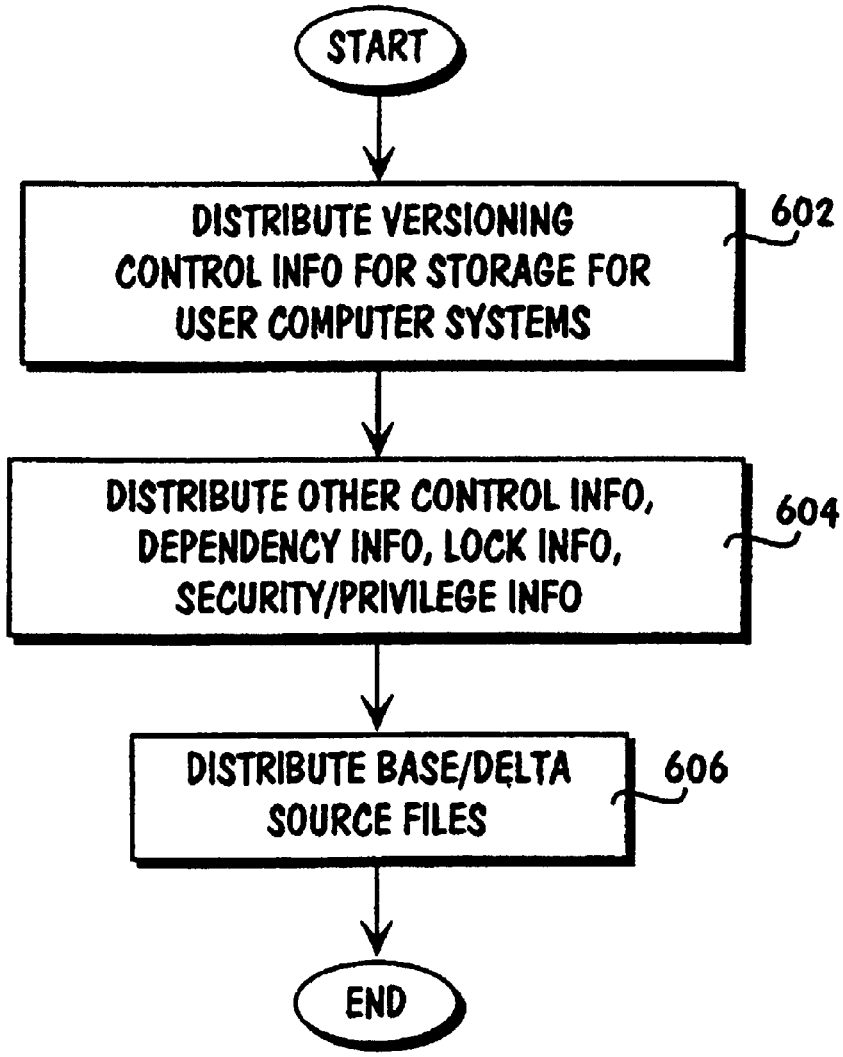

FIGS. 5–6 illustrate one embodiment each of various operational flows of vendor development/code control environment of FIG. 3. More specifically, FIG. 5 illustrates an exemplary embodiment of the operational flow of check-in function 306, whereas FIG. 6 illustrates an exemplary embodiment of the operational flow of distributor 316. Other operational flows not described are known in the art. As illustrated, in response to the receipt of a base/delta source file, step 502, check-in function 306 generates and assigns an UUID to identify the base/delta source file, step 504. As described earlier, the UUID uniquely identifies the base/delta source file not only among other source files of the program product, but all other source files of all other program products, regardless whether they are of the same vendor or not. As alluded to earlier, the object file generated from source files inclusive of the delta source file is also identified by the same UUID. In one embodiment, check-in function 306 employs an approach similar to the approach commonly employed in the art of networking for identifying packets, that is, generating the UUID as a function of date, time and the network address of the computer system executing check-in function 306. In one embodiment, check-in function 306 supports the checking in of a delta file as either an update or a patch to the source file. In the "update" case, a new "version" of the source file is considered to have been formed if the delta file is included, whereas in the "patch" case, the "version" state of the source file is considered to be unchanged, even if the delta file is included.

Upon generating and assigning the UUID to the base/delta source file, check-in function 306 generates the genealogy for the UUID, i.e. its predecessor ID, and if applicable, dependency and other control information, step 506. The predecessor UUID is determined based on the UUID of the check-out version of the source file, from which the delta source file is generated. For a base source file with no check-out version of the source file, check-in function 306 generates a "null" predecessor UUID. The dependency and other control information are determined based on information stored in associated control files generated by compiler/linker 312. Next, check-in function 306 stores the base/delta source file in library 302, and the predecessor UUID, dependency and other control information (if any) in repository 304, step 508.

At step 602, distributor 316 retrieves the versioning control information of a program product, and distributes them for storage for a user system. As will be described in more details below, the versioning control information are distributed for storage in a common repository of the user system employed to store versioning control information for multiple program products of multiple vendors installed on the user system. In one embodiment, the common repository is operated by a MVCCS serving only the user system. In one embodiment, the common repository is operated by a MVCCS that operates and maintains multiple common repositories for multiple user systems, on a user system by user system basis.

For the illustrated embodiment, distributor 316 also retrieves and distributes other associated control information, step 604. In one embodiment, distributor 316 retrieves and distributes intra as well as cross program product dependency control information. In one embodiment, distributor 316 also distributes locking information that locks down certain base/delta source files to prevent them from further update/modification. In one embodiment, distributor 316 also distributes security/privilege information to prevent unauthorized update/modification to the corresponding base/delta source file.

For the illustrated embodiment, distributor 316 also retrieves the base/delta source files 318 from library 302, and distributes them for storage for the user system, step 606. As will be described in more detail below, in one embodiment, the base/delta source files are also distributed on a user system by user system basis. In other embodiments, the base/delta source files are distributed to server systems (also referred to as proxies of the user systems), each serving a group of user systems, such as a corporate server or a publisher server. In alternate embodiments, object files 319 may also be retrieved and distributed.

While for ease of understanding, the various types of versioning control information distributed by distributor 316 were incrementally described as separate discrete steps, it should be noted that their distribution may be combined in any one of a number of application dependent manners. For example, all the "secondary" versioning control information, i.e. dependency, locking etc., may be combined and distributed together.

Figure 7:
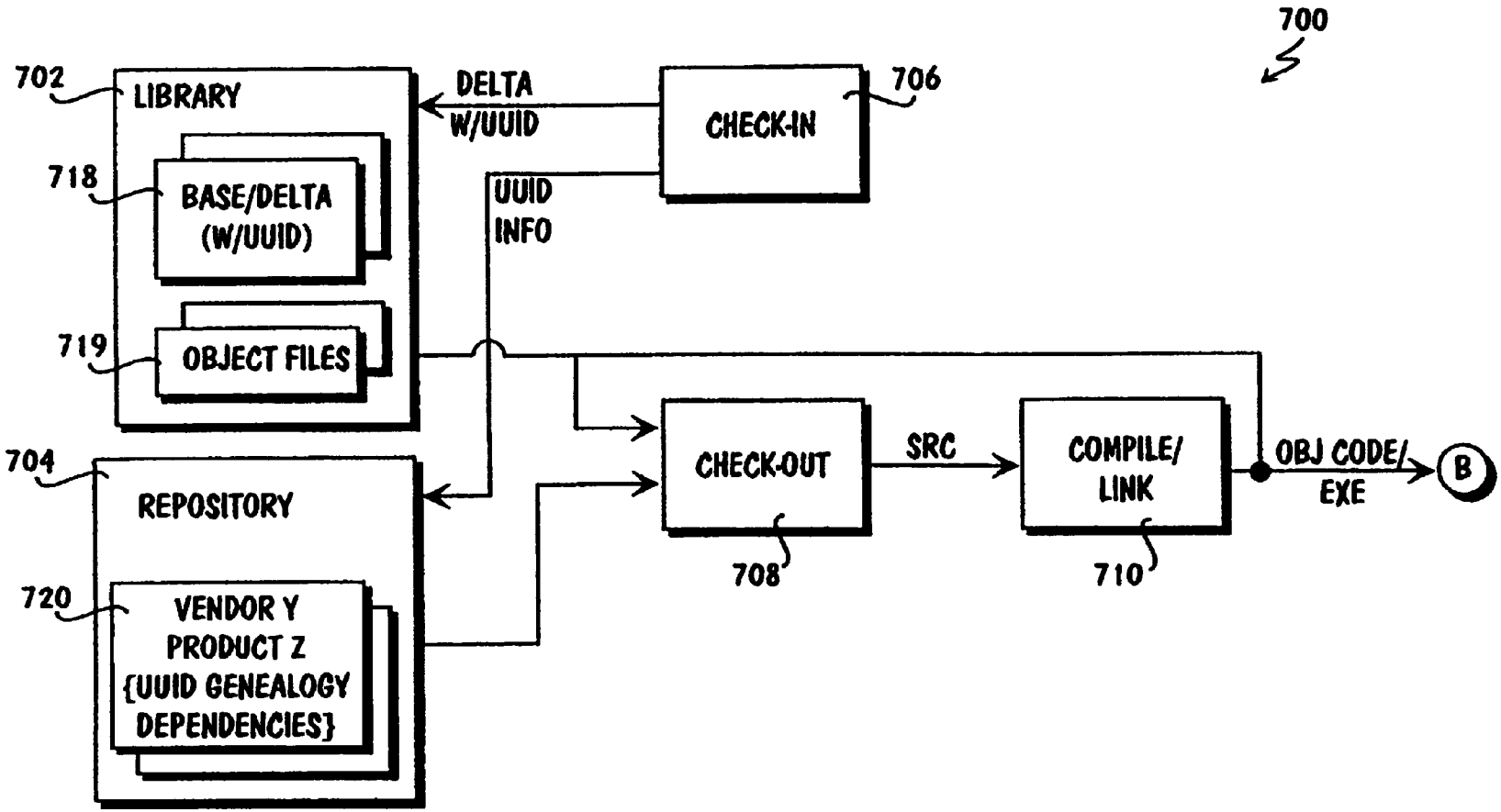
FIG. 7 illustrates one embodiment of the MVCCS of FIG. 2.

Referring now to FIG. 7 wherein one embodiment of the MVCCS of FIG. 2 is shown. As illustrated, MVCCS 700 includes common library 702, common repository 704, check-in and check out functions 706–708, and compiler/linker 710. The elements are operatively coupled to each other as shown. Similar to the library and the repository earlier described for a vendor's development/code control environment, common library 702 and repository 704 are employed to store base/delta source files 718, object files 719 and corresponding versioning control information 720 of program products, except in accordance with the present invention, they are employed to store base/delta source files 718, object files 719 and corresponding versioning control information 720 of program products of multiple vendors. This is advantageously made possible by the program product vendors employment of UUIDs to identify the source and object files of their program products.

Check-in function 706 performs its conventional function of checking base/delta source files 718 and versioning control information 720 into common library 702 and repository 704 as they are received from the vendor. For the purpose of this application, the term "receive" include "receiving" applicable ones of the base/delta source files 718, object files 719 and versioning control information 720 from a distribution medium as well as from a server of a vendor. Check-out function 708 performs its conventional function of selectively retrieving different versions of source files 718 from common library 702, using versioning control information 720 stored in common repository 704, whereas compiler/linker 710 performs its conventional function of compiling/link editing the retrieved compilable source files into object code or executables. [Note that if object files are also distributed, the processing of source files is typically optional.]

In one embodiment, all illustrated elements, i.e. common library 702, common repository 704, check-in and check-out functions 706–708 and compiler/linker 710 are all disposed on the user system where the program products are installed or being installed. In an alternate embodiment, all illustrated elements, except common library 702 are disposed on the user system. Library 702 is either disposed on a "corporate/publisher" server serving multiple user systems, or on the vendor's server, and check-out function 708 retrieves source files 718 or object files 719 from the "corporate/publisher" or vendor server through a private/public network on an as needed basis, using versioning control information 720 stored in common repository 704. Accordingly, check-in function 706 receives only versioning control information 720 from the vendor, and as described earlier, stores them in common repository 704. Generation of the object code/executables, if applicable, are still performed on the user system where the program products are installed or being installed.

In yet another embodiment, only check-out function 708 and compiler/linker 710 are disposed on the user system where the program products are installed. Common repository 720 and check-in function 706 are disposed on a "corporate/publisher" server serving multiple user systems. In other words, the "corporate/publisher" server maintains multiple common repositories, one for each user system, on a one-to-one correspondence basis. Upon receipt of versioning control information 720 of a program product, check-in function 706 stores them into the corresponding common repositories of the user systems where the program product is installed or to be installed. As in the immediately above described embodiment, library 702 is either disposed on the same/another "corporate/publisher" server serving multiple user systems or on the vendor's server. Check-out function 708 retrieves source files 718 or object files 719 from the "corporate/publisher" or vendor server through a private/public network on an as needed basis, using versioning control information 720 stored in the corresponding common repository 704 disposed on the "corporate/publisher" server. Generation of the object code/executables, if applicable, are still performed on the user system where the program products are installed.

In yet another embodiment, none of the illustrated elements are disposed on the user system where the program products are installed. Common repository 720, check-in and check-out functions 706–708, and compiler/linker 710 are disposed on a "corporate/publisher" server serving multiple user systems. As in the immediately above described embodiment, the "corporate/publisher" server maintains multiple common repositories 720, one for each user system, on a one-to-one correspondence basis. Upon receipt of versioning control information 720 of a program product, check-in function 706 stores them into the corresponding common repositories 720 of the user systems where the program product is installed or to be installed. Also similar to the immediately above described embodiment, library 702 is either disposed on the same/another "corporate/publisher" server serving multiple user systems or on the vendor's server. Check-out function 708 retrieves source files 718 or object files 719 from the "corporate/publisher" or vendor server through a private/public on an as needed basis, using versioning control information 720 stored in the corresponding common repository 704 disposed on the "corporate" server. For this embodiment, generation of the object code/executables, if applicable, are performed on the "corporate/publisher" server, and then "downloaded" to the user systems.

To summarize, in each of these embodiments, a common repository 704 is maintained for each user system to store versioning control information 720 of the program products installed or to be installed on the user system. The common repository 704 may be disposed on the user system, or on a "corporate/publisher" server, provided the one-to-one correspondence is maintained. Common library 702 may be complementarily disposed on the user system, the same/another "corporate/publisher" server or the vendor's server, depending on where common repository 704 is disposed. Likewise, check-in and check-out functions 706–708 and compiler/linker 710 are also complementarily disposed, depending on whether common library 702 and common repository 704 are disposed. Note that while in accordance to the teachings of the present invention, one-to-one correspondence to the user system is always maintained for common repository 704, such one-to-one correspondence to the user system is merely preferred but not mandated for common library 702.

Figure 8:
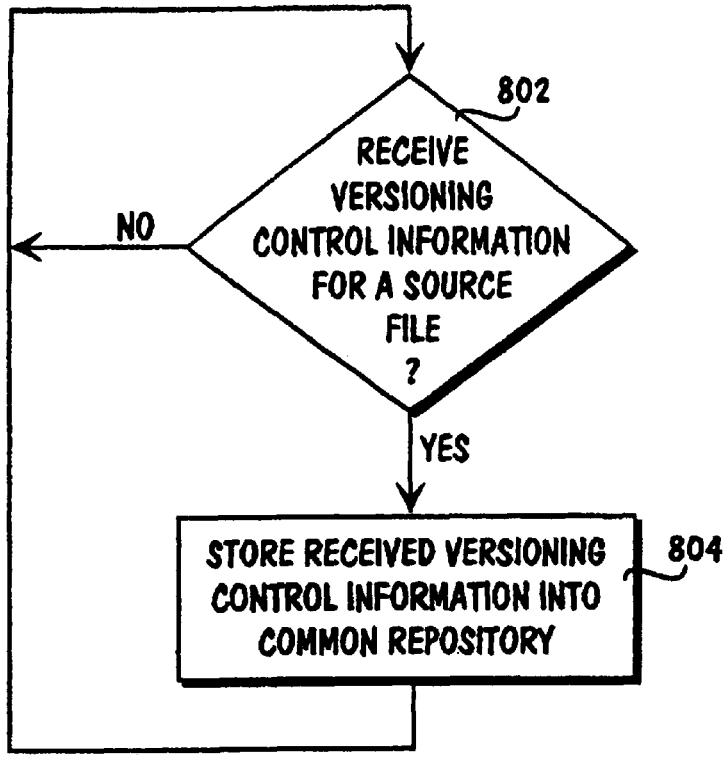
FIG. 8 illustrates one embodiment of the operational flow of the check-in module of FIG. 7.

FIG. 8 illustrates one embodiment of the operational flow of the check-in function of FIG. 7 for receiving and storing versioning control information. As shown, at step 802, check-in function 706 awaits versioning control information of the program products of the vendors. At step 804, in response to the receipt of the versioning control information for one or more base/delta source files or object files of a program product from a vendor, check-in function 706 stores the received versioning control into the common repository 704 for the user system. Check-in function 706 stores the received information to the same common repository 704 without regard to the vendor. Recall as described earlier, common repository 704 may or may not be disposed on the user system. Check-in function 706 repeats steps 802–804 as many times as it is necessary until versioning control information are stored into common repository 704 for the user system for all source/object files of all program products, regardless of vendors, to be installed or installed on the user system.

In an embodiment, where check-in function 706 also receives source and/or object files of the program products, check-in function 706 handles the receipt and storing of the source and/or object files in like manner as described above for the versioning control information of these source and object files.

Figure 9:
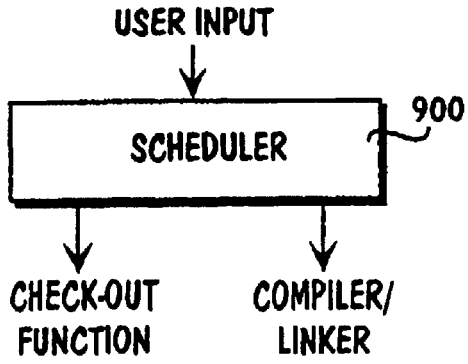
FIGS. 9–11 illustrate one embodiment of a time based approach to facilitate a user in controlling program product regeneration for the user's system, including a scheduler, its user interface and operational flow.
Figure 10:
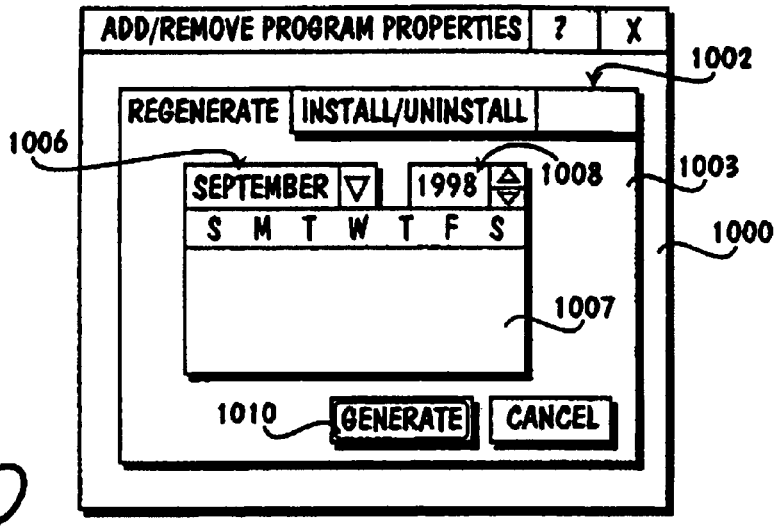
Figure 11:
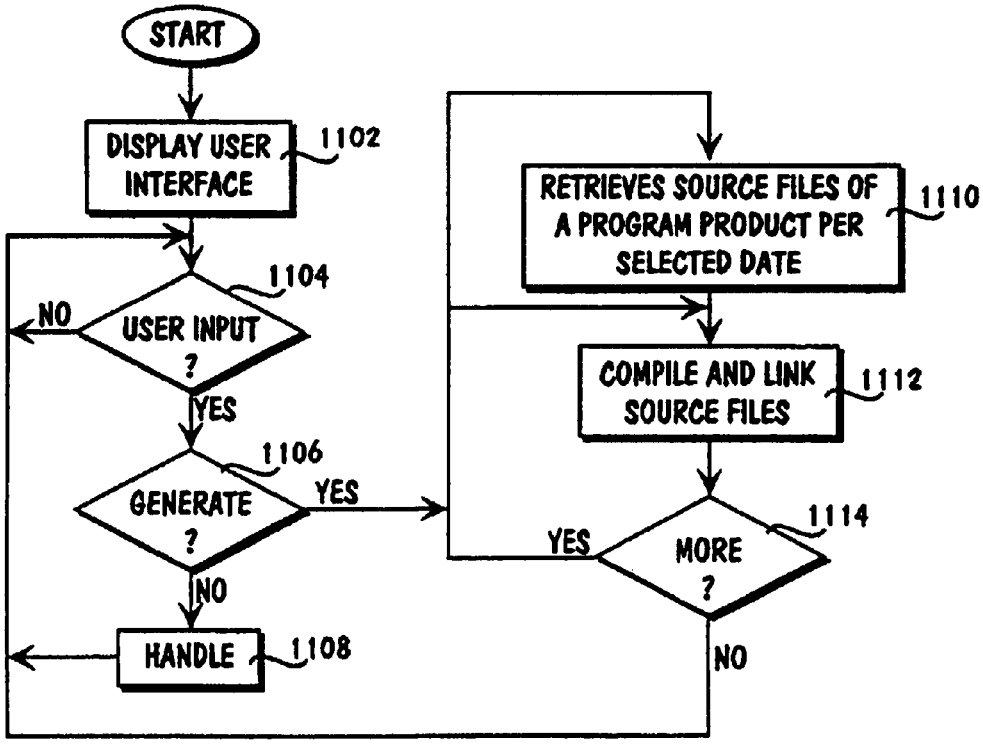

The novel user centric approach to program product distribution provides numerous advantages over the prior art vendor centric approach to a user of an user system endowed with the present invention. As an example, FIGS. 9–11 illustrate a time based approach to controlling regeneration of program products installed on the user's system offerable to the user as a result of the present invention. Illustrated in FIG. 9 is scheduler 900 that can selectively invoke the above described check-out function and compiler/linker of the MVCCS of the present invention to regenerate the program products installed on the user system relative to a time reference, in response to a user's input for the time reference. FIG. 10 illustrates an exemplary user interface of scheduler 900, and FIG. 11 illustrates one embodiment of the operational flow of scheduler 900.

As illustrated in FIG. 10, exemplary user interface 1000 from which the user may select a date, based on which the installed program products of the user system will be regenerated, includes various pop up panels 1002 related to managing program products installation/uninstallation and regeneration for the user system relative to a time reference. Pop up panels 1002 includes in particular regeneration panel 1003 having calendar 1004. Calendar 1004 includes month pop up 1006 and year pop up 1008 to facilitate the user in denoting a date, against which the program product regeneration is to be performed. Additionally, regeneration panel 1003 includes "generate" button 1010 to cause the regeneration process to be started. In alternate embodiments, finer granularity may be employed to specified the time reference against which the regeneration is to be performed. Other control buttons as well as selection features may also be included.

As illustrated in FIG. 11, at step 1102, in response to a user input, e.g. a user's selection of a program product management icon, the above described exemplary user interface is presented to the user. At step 1104, scheduler 900 awaits for the user's inputs. Upon receipt of a user's input, scheduler 900 determines if the user has selected the "generate" button, step 1106. If the determination is negative, implying that the user has selected other selection features, scheduler 900 handles the user selection accordingly, in an application dependent manner, step 1108. For example, in response to the selection of the down arrow button associated with the month pop up, the month list is displayed. However, if it is determined that the user has selected the "generate" button, scheduler 900 selectively invokes the above described check-out function and if applicable, the compiler/linker of the MVCCS of the present invention to cause the "latest" version of the program products, defined in accordance with the reference date selected by the user, to be regenerated, using the versioning control information stored in the common repository maintained for the user system, step 1112. The regeneration is either through direct retrieval of the applicable object files (i.e. without step 1110) or indirectly, through retrieval of the applicable source files, step 1110, and recompiling the source files to re-generate the needed object files, step 1112. Step 1112 and optionally 1110 are repeated as many times as it is necessary until object code/executables for all program products previously installed on the user system have been regenerated.

Those skilled in the art will appreciate that the above described time based approach to facilitate a user in controlling program product regeneration for his/her system is especially helpful to the user in dealing with system regression caused by the installation of one or more new program products. Through the above described exemplary user interface, the user can easily select an earlier date where the user knows his/her system was operating without the recently encountered problems, and with the click of a control button, the user's system is automatically restored back to a prior known properly operating state, without requiring the user to resolve various intra and/or inter program product dependency problems. Similarly, from one known good operating state, the user can also easily select a later date, and with the click of a control button, the user's system is automatically forwarded to a new state to determine whether the system can operate reliably for the user, again without requiring the user to resolve various intra and/or inter program product dependency problems. In general, the user may cause as many "undos" and/or "redos" to be performed in any order and as often as it is desired. Note that the "undos" and/or "redos" may be performed for other non-reliability related reasons, such as compatibility, Furthermore, in lieu of or in addition to the above described time based approach to controlling program product regeneration, the present invention may also be practiced in conjunction with an usage characteristic based approach to software customization, as disclosed in copending U.S. patent application Ser. No. 09/176,692, filed Oct. 21, 1998, and entitled "Usage Characteristic Based Software Customization", which is hereby fully incorporated by reference (except for the reciprocating incorporation). For those embodiments where source files are also provided to the user systems or their proxies, the present invention may also be practiced with some or all of the vendors employing security mechanisms to protect their source files. The security mechanisms may be any one of these techniques known in the art, such as a private/public key approach.

While the present invention has thus far been substantially described in the context of empowering user systems with the ability to managing source files from multiple program product vendors, those skilled in the art will appreciate that the benefits of the present invention are not restricted to only this dimension of relationship between a user system and its vendor. Under the present invention, a vendor of a program product may easily provide to its user systems simple extensions it needs in another program product of a different vendor without requiring close cooperation or support from the other vendor. Similarly, users of a program product of a more recent version level may temporarily enable other peer users of the program product of an earlier version level to facilitate data or file sharing between the users. Thus, it is anticipated that the present invention will also benefit inter-vendor as well as inter-user cooperation, leading to an overall improved interoperability experience for the users.

Figure 12:
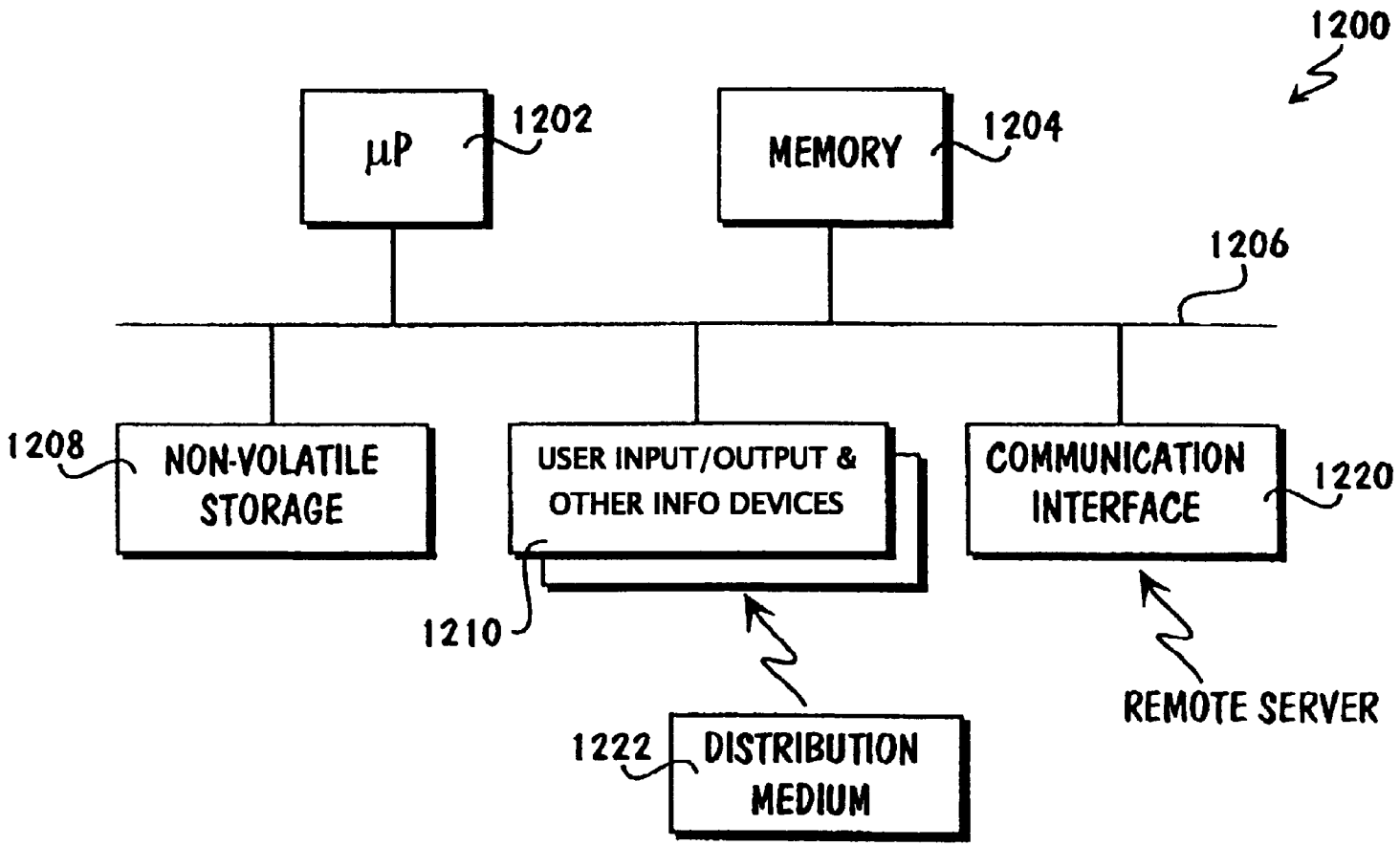
FIG. 12 illustrates one embodiment of an exemplary computer system suitable for use to practice the present invention.

Lastly, we refer now to FIG. 12, wherein one embodiment of an exemplary computer system suitable for use to practice the present invention, in particular as a user system, is illustrated. As shown, exemplary computer system 1200 includes processor 1202 and system memory 1204 coupled to each other via system bus 1206. Coupled also system bus 1206 are non-volatile storage 1208, various user input/output *and other information* devices 1210 and communication interface 1220. Each of these elements perform its conventional functions known in the art. In particular, system memory 1204 and non-volatile storage 1208 are employed to store a working copy and a permanent copy of the programming instructions implementing the teachings of the present invention. The permanent copy of the programming instructions may be loaded into non-volatile storage 1208 in the factory, or in the field, through distribution medium 1222 or through communication interface 1220. As described earlier, any one of a number of recordable medium such as tapes and so forth may be employed. The constitution of these elements 1202–1220 are also well known, and accordingly will not be further described.

Thus, a novel user centric approach to program product distribution, including a complementary multi-vendor code control system, has been described. While the present invention has been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. A computer implemented method comprising:

generating versioning control information for a plurality of [source/object] files of a program product; and distributing [a plurality of] *the versioning control information to one or more user or non-user computer systems, wherein a user computer system stores the versioning control information for the user computer system's own use, and a non-user computer system correspondingly stores one or more* copies of the versioning control information [for storage] for [a plurality of] *one or more* user computer systems, with the storage of the versioning control information being performed on a user computer system by user computer system basis, one copy of the versioning control information per user computer system, *enabling each user computer system to use the corresponding copy of the versioning control information to selectively generate a version of the program product desired by the user computer system independent of other user computer systems*.

2. The method of claim 1, wherein *the files comprise source files, and* each of the source files [are] *is* in either a base or a delta form, and the method further comprises generating and assigning an universally unique identifier (UUID) to identify each of the base[/] *or* delta source files.

3. The method of claim 1, wherein *the files comprise source files, and* said generating of versioning control information for the plurality of source[/object] files comprises generating predecessor UUID information *for selected ones of the source files*.

4. The method of claim 1, wherein said distributing [of versioning control information for storage for a plurality of user computer systems,] comprises distributing *to a non-user computer system* the versioning control information for *corresponding* storage *of a plurality of copies of the versioning control information* in a plurality of repositories *for a plurality of user computer systems*, one *copy per* repository [for each] *per* user computer system, each repository storing versioning control information of a plurality of program product*s* [vendors] for [a] *the* corresponding user computer system.

5. The method of claim 1, wherein the method further comprises distributing [source/object] *to a non-user computer system the* files for *corresponding* storage *of one or more copies of the files* in [a plurality of corresponding] *one or more* libraries *for one or more user computer systems*, one *copy of the files per* library [for each] *per* user computer system, each library storing [source/object] files for a plurality of program product*s* [vendors] for [a] *the* corresponding user computer system.

6. The method of claim 1, wherein said distributing [of versioning control information] further comprises distributing *to a user or non-user computer system* selected ones of (a) dependency information, including cross program product dependency information *for some of the files*, (b) locking information for selected ones of the [source] files to prevent the selected ones *of the files* from being updated, and (c) privilege or security information for *some of* the [source] files.

7. The method of claim 1, wherein said *files comprise* source files [are] written in a selected one of a text mark up language and a natural language.

8. An apparatus comprising:

a storage medium;

a processor;

a code control/distribution system stored in said storage medium to be operated by the processor to generate versioning control information for a plurality of [source/object] files [of] *associated with* a program product, and to distribute [a plurality of] *the versioning control information to one or more user or non-user computer systems for a user computer system to store a copy of the versioning control information for the user computer system's own use, and for a non-user computer system to correspondingly store one or more* copies of the versioning control information for [storage for a plurality of] *one or more* user computer systems, with the *corresponding* storage of the versioning control information being performed on a user computer system by user computer system basis, one copy of the versioning control information per user computer system, *to enable each of the user computer systems to be able to use the copy of the versioning control information correspondingly stored for the user computer system to selectively generate a version of the program product desired by the user computer system independent of other user computer systems*.

9. The apparatus of claim 8, wherein *said files comprise source files, and* each of the [source] files [are] *is* in either a base or a delta form, and the code control/distribution system generates and assigns an universally unique identifier (UUID) to identify each of the base[/] *or* delta source files.

10. The apparatus of claim 9, wherein said code control/distribution system further generates predecessor UUID information for each of the base[/] *or* delta source files.

11. The apparatus of claim 8, wherein said code control/distribution system distributes the versioning control information [for storage in a plurality of] *to a non-user computer system to correspondingly store one or more copies of the versioning control information in one or more* repositories *for one or more user computer systems*, one *copy per* repository [for each] *per* user computer system, each repository storing versioning control information of a plurality of program product*s* [vendors] for [a] *the* corresponding user computer system.

12. The apparatus of claim 8, wherein the code control/distribution system further distributes *to a non-user computer system* the [source/object] files for *corresponding* storage [in a plurality of corresponding] *of one or more copies of the files in one or more* libraries *for one or more user computer systems*, one *copy per* library [for each] *per* user computer system, each library storing [source/object] files for a plurality of program product*s* [vendors] for [a] *the* corresponding user computer system.

13. The apparatus of claim 8, wherein said code control/distribution system further distributes *to a user or non-user computer system* selected ones of (a) dependency information, including cross program product dependency information *of the files*, (b) locking information for selected ones of the [source] files to prevent the selected ones *of the files* from being updated, and (c) privilege or security information for *some of* the [source] files.

14. The apparatus of claim 8, wherein said *files comprise* source files [are] written in a selected one of a text mark up language and a natural language.

15. An article of manufacture comprising:

a recordable medium having recorded thereon a plurality of programming instructions for use to program an apparatus to enable the apparatus to be able to generate versioning control information for a plurality of [source/object] files of a program product, and to be able to distribute [a plurality of] *the versioning control information to one or more user or non-user computer systems for a user computer system to store a copy of the versioning control information for the user computer system's own use, and for a non-user computer system to correspondingly store one or more* copies of the versioning control information [for storage for a plurality of] *for one or more* user computer systems, with the storage of the versioning control information being performed on a user computer system by user computer system basis, one copy of the versioning control information per user computer system, *to enable each of the user computer systems to be able to use the copy of the versioning control information correspondingly stored for the user computer system to selectively generate a version of the program product desired by the user computer system independent of other user computer systems*.

16. The article of manufacture of claim 15, wherein [each of] the *files comprise* source files [are] in either a base or a delta form, and the programming instructions enable the apparatus to be able to generate and assign an universally unique identifier (UUID) to identify each of the base[/] *or* delta source files.

17. The article of manufacture of claim 16, wherein said programming instructions enable the apparatus to be able to generate predecessor UUID information for each of the base[/] *or* delta source files.

18. The article of manufacture of claim 15, wherein the programming instructions enable the apparatus to be able to distribute the versioning control information [for storage] *to a non-user computer system to correspondingly store one or more copies of the versioning control information* in [a plurality of] *one or more* repositories *for one or more user computer systems*, one *copy per* repository [for each] *per* user computer system, each repository storing versioning control information [of source/object files of] *associated with* a plurality of program product*s* [vendors] for [a] *the* corresponding user computer system.

19. The article of manufacture of claim 15, wherein said programming instructions enable the apparatus to be able to distribute *to a non-user computer system* the [source/object] files [for storage in a plurality of corresponding] *to correspondingly store one or more copies of the files in one or more* libraries *for one or more user computer systems*, one *copy per* library [for each] *per* user computer system, each library storing [source/object] *the* files for a plurality of program product*s* [vendors] for the corresponding user computer system.

20. The article of manufacture of claim 15, wherein said programming instructions further enable the apparatus to be able to distribute *to a non-user computer system* selected ones of (a) dependency information, including cross program product dependency information *of some of the files*, (b) locking information for selected ones of the [source] files to prevent the selected ones *of the files* from being updated, and (c) privilege or security information for *some of* the [source] files.

21. A computer implemented method comprising:

facilitating receipt and storage into a common repository for a user computer system [private copies] *a first and a second own copy* of versioning control information [of the user computer system] of a first and a second plurality of [source/object files] *files associated with a first and a second program product* of a first and a second software vendor *respectively*; and facilitating retrieval of selective versions of the first and second plurality of [source/object] files for the user computer system using said [private] *first and second own* copies of versioning control information of the user computer system stored in the common repository for the user computer system *to selectively generate a first and a second version of the first and second program products desired by the user computer system independent of other user computer systems*.

22. The method of claim 21, wherein

[each of the first and second plurality of] *said files comprise* source files [is] *in* either a base or a delta [source file] *form*, identified with an universally unique identifier (UUID), and said facilitating [of receipt and storage into a common repository for the user computer system versioning control information of the first and second plurality of source files,] comprises facilitating receipt and storage into the common repository for the user computer system predecessor UUID information for the corresponding UUID of [the first and second plurality of base/delta] *one or more* source files.

23. The method of claim 21, wherein said facilitating [of receipt and storage into a common repository for the user computer system versioning control information of the first and second plurality of source/object files,] comprises facilitating receipt and [storage] *storing* into a common repository disposed on the user computer system said *own copies of the* versioning control information.

24. The method of claim 21, wherein said method further comprises [of] facilitating receipt and [storage] *storing* of the first and second plurality of [source/object] files *of the first and second program products* of the first and second software vendors, *including first and second source files,* each *source file* being identified with an universally unique identifier (UUID).

25. The method of claim 24, wherein said facilitating [of receipt and storage of the first and second plurality of source/object files identified by UUID] comprises facilitating receipt and [storage] *storing* into a common library for the user computer system the first and second plurality of [source/object] files, *including first and second source files, each source file being* identified by *an* UUID.

26. The method of claim 25, wherein said common library is disposed on the user computer system.

27. The method of claim 21, wherein

[said first and second plurality of source/object files are source/object files of a first and a second software program product of the first and the second software vendor, and]

[said facilitating of retrieval of] *the method further comprises using the* selective versions of the first and second plurality of [source/object] files [is performed] *retrieved* to [facilitate selective generation of] *selectively generate* the *first and second versions of the* first and[/or the] second software program product*s* for the user computer system *independent of other computer systems*.

28. The method of claim 27, wherein said facilitating of retrieval of selective versions of the first and second plurality of [source/object] files [is performed to facilitate] *and* selective generation of the first and[/or the] second [software] *versions of the* program product*s* for the user computer system, *independent of other user computer systems, are performed* in response to a request expressed in a timeline context by a user of the user computer system.

29. The method of claim 27, wherein said facilitating of retrieval of selective versions of the first and second plurality of [source/object] files [is performed to facilitate] *and* selective generation of the first and[/or the] second [software] program product*s* for the user computer system, *independent of other user computer systems, are performed* to maintain software compatibility [for] *on* the user computer system.

30. The method of claim 29, wherein said facilitating of receipt and storage into a common repository for the user computer system versioning control information of the first and second plurality of [source/object] files further comprises facilitating receipt and storage into the common repository for the user computer system selected ones of (a) dependency information, including cross software product dependency information, for [the different versions] *some* of the first and second plurality of [source/object] files of the first and second [software] program products, (b) locking information for selected ones of the first and second plurality of [source] files to prevent the selected [ones] *files* from being updated, and (c) privilege or security information for *some of* the first and second plurality of [source] files.

31. A user computer system comprising:

a processor;

a storage medium;

a multi-vendor code control system (MVCCS) stored into the storage medium for operation by the processor to facilitate receipt and storage into a common repository for the user computer system, [private] *first and second own* copies of versioning control information of the user computer system of a first and a second plurality of [source/object files] *files of a first and a second program product* of a first and a second software vendor *respectively*, and to facilitate retrieval of selective versions of the first and second plurality of [source/object] files for the user computer system, using said [private] *own* copies of the versioning control information of the user computer system stored in the common repository for the user computer system, *to selectively generate desired versions of the first and second program products for the user computer system independent of other user computer systems*.

32. The user computer system of claim 31, wherein

[each of] the first and second plurality of *files comprise* source files [is] *in* either a base or a delta [source file] *form*, identified with an universally unique identifier (UUID), and said MVCCS facilitates receipt and storage into the common repository for the user computer system predecessor UUID information for the corresponding UUID of [the first and second plurality of base/delta] *each* source file[s].

33. The user computer system of claim 31, wherein said user computer system further includes said common repository for the user computer system.

34. The user computer system of claim 31, wherein said MVCCS further facilitates receipt and storage of the first and second plurality of [source/object] files *of the first and second program products* of the first and second software vendors, each being identified with an universally unique identifier (UUID).

35. The user computer system of claim 34, wherein said MVCCS further facilitates receipt *from the first and the second distributor,* and storage of the first and second plurality of *object files or a combination of source and* [source/] object files identified by UUID into a common library for the user computer system.

36. The user computer system of claim 35, wherein said user computer system further includes said common library.

37. The user computer system of claim 31, wherein

[said first and second plurality of source/object files are source files of a first and a second software program product of the first and the second software vendor, and]

said MVCCS *is adapted to* perform[s] said facilitating of retrieval of selective versions of the first and second plurality of [source/object] files to facilitate selective generation *of the desired versions* of the first and[/or the] second [software] program product*s* for the user computer system.

38. The user computer system of claim 37, wherein said user computer system further comprises input/output devices to facilitate a user of the user computer system to submit a request in a timeline context to cause said MVCCS to facilitate said retrieval of selective versions of the first and second plurality of [source/object] files to facilitate selective generation of the *desired versions of the* first and[/or the] second [software] program product*s* for the user computer system.

39. The user computer system of claim 37, wherein said MVCCS *is adapted to* facilitate[s] said retrieval of selective versions of the first and second plurality of [source/object] files to facilitate selective generation of the first and[/or the] second [software] program product*s* for the user computer system to maintain software compatibility for the user computer system.

40. The user computer system of claim 37, wherein said MVSCS *is* further *adapted to* facilitate[s] receipt and storage into the common repository for the user computer system selected ones of (a) dependency information, including cross software product dependency information, for the different versions of the first and second plurality of [source/object] files of the first and second [software] program products, (b) locking information for selected ones of the first and second plurality of [source] files to prevent the selected [ones] *files* from being updated, and (c) privilege or security information for the first and second plurality of [source] files.

41. An article of manufacture comprising:

a recordable medium having recorded thereon a plurality of programming instructions for use to program an apparatus to enable the apparatus to be able to facilitate receiving and storing into a common repository for a user computer system, [private] *first and second own* copies of versioning control information of [the user computer system of] a first and a second plurality of [source/object files] *files* of *a first and a second program product of* a first and a second software vendor *respectively*, and to be able to facilitate retrieval of selective versions of the first and second plurality of [source/object] files for the user computer system using said [private] *first and second own* copies of versioning control information of the user computer system stored in the common repository for the user computer system, *to selectively generate first and second desired versions of the first and second program products independent of other user computer systems*.

42. The article of manufacture of claim 41, wherein [each of] the first and second plurality of *files comprise* source files [is] *in* either a base or a delta source [file] *form*, identified with an universally unique identifier (UUID), and said programming instructions enable the apparatus to be able to facilitate receipt and storage into the common repository for the user computer system, predecessor UUID information for the UUIDs of the [first and second plurality of base/delta] source files.

43. The article of manufacture of claim 41, wherein said programming instructions further enable the apparatus to be able to facilitate receipt and storage into a common source library for the user computer system, the first and second plurality of [source/object] files of *the first and second program products of* the first and second software vendors, each being identified with an universally unique identifier (UUID).

44. The article of manufacture of claim 41, wherein [said first and second plurality of source/object files are source/object files of a first and a second software program product of the first and the second software vendor, and] said facilitating of retrieval of selective versions of the first and second plurality of [source/object] files [is] *are* performed to facilitate selective generation of the first and/or the second software program product for the user computer system, *independent of other user computer systems*.

45. The article of manufacture of claim 44, wherein said programming instructions enable the apparatus to be able to facilitate retrieval of selective versions of the first and second plurality of [source/object] files for selective generation of *different versions of* the first and[/or the] second [software] program product*s* for the user computer system, in response to a request expressed in a timeline context by a user of the user computer system.

46. The article of manufacture of claim 44, wherein said programming instructions enable the apparatus to facilitate retrieval of selective versions of the first and second plurality of [source/object] files for selective generation of *different versions of* the first and[/or the] second [software] program product*s* for the user computer system to maintain software compatibility for the user computer system.

47. The article of manufacture of claim 41, wherein said programming instructions further enable the apparatus to facilitate receipt and storage into the common repository for the user computer system selected ones of (a) dependency information, including cross software product dependency information, for the different versions of *some of* the first and second plurality of [source/object] files of the first and second [software] program products, (b) locking information for selected ones of the first and second plurality of [source] files to prevent the selected [ones] *files* from being updated, and (c) privilege or security information for *some of* the first and second plurality of [source] files.

*48. A method comprising:*

*receiving first versioning control information for a plurality of files associated with a first software product; and*

*correspondingly storing a plurality of copies of the first versioning control information in a first storage medium for a plurality of user computer systems, wherein a respective copy of the first versioning control information is stored for each user computer system using a one-to-one correspondence to enable each of the user computer systems to be able to use the copy of the first versioning control information correspondingly stored for the user computer system to selectively generate a version of the first software product desired by the user computer system independent of other user computer systems.*

*49. The method of claim 48, further comprising:*

*receiving second versioning control information for a plurality of files associated with a second software product; and*

*correspondingly storing a plurality of copies of the second versioning control information in a second storage medium, for a plurality of user computer systems, wherein a respective copy of the second versioning control information is stored for each user computer system using a one-to-one correspondence to enable each of the user computer systems to be able to use the copy of the second versioning control information correspondingly stored for the user computer system to selectively generate a version of the second software product desired by the user computer system independent of other user computer systems.*

*50. The method of claim 49, wherein the first and second storage media are one of the same storage medium.*

*51. An apparatus comprising:*

*a processor; and*

*a multi-vendor control system (MVCS) configured to be operated by the processor to*

*receive first versioning control information for a plurality of files associated with a first software product; and*

*correspondingly store a plurality of copies of the first versioning control information in a first storage medium for a plurality of user computer systems, wherein a respective copy of the first versioning control information is stored for each user computer system using a one-to-one correspondence to enable each of the user computer systems to be able to use the copy of the first versioning control information correspondingly stored for the user computer system to selectively generate a version of the first software product desired by the user computer system independent of other user computer systems.*

*52. The apparatus of claim 51, wherein the MVCS is further configured to be operated by the processor to*

*receive second versioning control information for a plurality of files associated with a second software product; and*

*correspondingly store a plurality of copies of the second versioning control information in a second storage medium for a plurality of user computer systems, wherein a respective copy of the second versioning control information is stored for each user computer system using a one-to-one correspondence to enable each of the user computer systems to be able to use the copy of the second versioning control information correspondingly stored for the user computer system to selectively generate a version of the second software product desired by the user computer system independent of other user computer systems.*

*53. The apparatus of claim 51, wherein the first and second storage media are one of the same storage medium.*

*54. A method of operation to be performed by a user computer system, comprising:*

*accessing a library associated with the user computer system on a one-to-one basis to retrieve first and second versioning control information of a first and second plurality of files of a first and a second software product of a first and second vendor, respectively; and*

*generating a first and a second version of the first and second software products, using the retrieved first and second versioning control information of the first and second plurality of files and the first and second software products, respectively, independent of other user computer systems.*

*55. The method of claim 54, further comprising receiving and storing into the library, the first and second copies of the first and second versioning control information of the first and second plurality of files of the first and second software products of the first and second vendors.*

*56. The method of claim 54, wherein the first and second vendors are one of the same vendor.*

*57. A user computer system comprising:*

*a processor; and*

*a multi-vendor control system (MVCS) configured to be operated by the processor to access a library associated with the user computer system on a one-to-one basis, to retrieve from a first and a second own copy of first and second versioning control information of first and second plurality of files of a first and a second software product of a first and a second vendor, respectively, and generate a first and a second version of the first and second software product, using the retrieved first and second versioning control information of the first and second plurality of files of the first*

*and second software products, respectively, independent of other user computer systems.*

*58. The user computer system of claim 57, wherein the MVCS is further configured to receive and store into the library, the first and second copies of the first and second versioning control information of the first and second plurality of files of the first and second software products of the first and second vendors.*

*59. The user computer system of claim 57, further comprising a storage device communicatively coupled to the processor in which said library is stored.*

*60. The user computer system of claim 57, wherein the first and second vendors are one of the same vendor.*

*61. The method of claim 1, wherein the versioning control information includes dependency information between files.*

*62. The method of claim 61, wherein the dependency information includes cross program product dependency information.*

*63. The apparatus of claim 8, wherein the versioning control information includes dependency information between files.*

*64. The apparatus of claim 63, wherein the dependency information includes cross program product dependency information.*

* * * * *

UNITED STATES PATENT AND TRADEMARK OFFICE

CERTIFICATE OF CORRECTION

PATENT NO. : RE 40,633 E
APPLICATION NO. : 11/078918
DATED : February 3, 2009
INVENTOR(S) : Swain W. Porter It is certified that error appears in the above-identified patent and that said Letters Patent is hereby corrected as shown below:

Column 15
Line 53, "...source files..." should read --...source/files...--.

Column 16
Line 11, "...MVSCS..." should read --...MVCCS…--.

Signed and Sealed this

First Day of June, 2010

David J. Kappos

David J. Kappos
*Director of the United States Patent and Trademark Office*